United States Patent
Nakai et al.

(10) Patent No.: US 7,983,495 B2
(45) Date of Patent: Jul. 19, 2011

(54) IMAGE PROCESSING DEVICE AND METHOD

(75) Inventors: Motohiro Nakai, Kasugai (JP);
Tomohiro Fukuoka, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 944 days.

(21) Appl. No.: 11/889,772

(22) Filed: Aug. 16, 2007

(65) Prior Publication Data
US 2008/0044088 A1 Feb. 21, 2008

(30) Foreign Application Priority Data
Aug. 21, 2006 (JP) .................. 2006-224301

(51) Int. Cl.
*G06K 9/36* (2006.01)
(52) U.S. Cl. ....................................... 382/232
(58) Field of Classification Search .................. 382/232, 382/236, 238, 239, 240, 302, 304; 348/388.1, 348/394.1, 404.1, 407.1, 411.1, 420.1, 424.2, 348/430.1–431.1; 375/240.02, 240.12, 240.13, 375/240.24
See application file for complete search history.

(56) References Cited

U.S. PATENT DOCUMENTS

| | | | | |
|---|---|---|---|---|
| 5,212,742 A * | 5/1993 | Normile et al. | | 382/166 |
| 5,267,334 A * | 11/1993 | Normille et al. | | 382/236 |
| 5,461,679 A * | 10/1995 | Normile et al. | | 382/304 |
| 5,523,788 A | 6/1996 | Kannegundla et al. | | |
| 6,292,589 B1 * | 9/2001 | Chow et al. | | 382/239 |
| 6,757,019 B1 | 6/2004 | Hsieh et al. | | |
| 7,006,698 B2 * | 2/2006 | Adiletta et al. | | 382/236 |
| 7,415,159 B2 * | 8/2008 | Kondo et al. | | 382/232 |
| 2002/0019882 A1 | 2/2002 | Soejima et al. | | |
| 2003/0174903 A1 | 9/2003 | Chia et al. | | |
| 2005/0160200 A1 | 7/2005 | Saito | | |

FOREIGN PATENT DOCUMENTS
KR 2005-0075722 7/2005
* cited by examiner

*Primary Examiner* — Jose L Couso
(74) *Attorney, Agent, or Firm* — Arent Fox LLP

(57) ABSTRACT

An image processing device for use with a storage circuit processes image data for a frame formed by a plurality of pixels. The image processing device includes a first functional macro performing first image processing on the image data, generating first processed image data, and temporarily storing the first processed image in a predetermined region of the storage circuit. A second functional macro performs second image processing following the first image processing. The second functional macro reads the first processed image data from the predetermined region of the storage circuit, performs the second image processing on the first processed image data, and generates second processed image data. A monitor circuit, arranged in the first or second functional macro, monitors a frame processed by the other one of the functional macros and a number of a data line in the frame that is being processed.

16 Claims, 3 Drawing Sheets

IMAGE PROCESSING DEVICE AND METHOD

CROSS-REFERENCE TO RELATED APPLICATIONS

This application is based upon and claims the benefit of priority from prior Japanese Patent Application No. 2006-224301, filed on Aug. 21, 2006, the entire contents of which are incorporated herein by reference.

BACKGROUND

The present embodiment relates to an image processing device including functional macros for processing image data for frames and to a method for processing images.

In a digital camera, an imaging sensor, such as a CCD image sensor and the like, detects light and generates an electrical signal that is in accordance with the detected light. Then, an analog-to-digital (A/D) converter converts the electrical signal to a digital signal. Image data for a frame is generated from image data for a plurality of pixels, which form a picture. A preprocessor of an image data processor, which includes an LSI and the like, processes the image data in a predetermined mode and outputs image data in RGB format (Bayer data). A color space converter then converts the RGB image data into image data in YCbCr format.

The image data processor includes functional macros that sequentially perform resolution conversion and a Joint Photographic Experts Group (JPEG) process on the processed image data. The image data processed by and output from each functional macro are temporarily stored in a storage circuit formed by, for example, a synchronous DRAM (SDRAM).

A plurality of data lines forming a single frame are grouped in accordance with a predetermined mode to generate a plurality of blocks. Each functional macro performs image processing on each block. For example, each functional macro performs image processing by reading image data of an image processing target, that is, image data of an original frame, for each block from the storage circuit. The functional macro then rewrites the image data for each block that has undergone image processing to the storage circuit. After one functional macro rewrites the processed image data to the storage circuit, another functional macro starts the next image processing. In the prior art, the processing time for one frame is shortened by dividing the frame into blocks and performing image processing in parallel on parts of the frame with the plurality of functional macros.

The output timing of functional macros 0 and 1 will now be described with reference to the timing chart of FIG. 1. In the example of FIG. 1, frame 0 and frame 1 are each divided into a plurality of blocks, such as four blocks. The functional macro 0 reads the image data of each block, executes first image processing on each block, and outputs the processed block. Each block of the image data processed and output from the functional macro 0 is rewritten to the storage circuit.

The functional macro 1 monitors the number of data lines processed by the functional macro 0, reads the image data of each block rewritten to the storage circuit by the functional macro 0, executes the next image processing, and re-writes the block that has undergone image processing to the storage circuit. The image data of the frame rewritten to the storage circuit is ultimately stored in a portable memory card, such as a Compact Flash (registered trademark), or an SD memory card (registered trademark), via an interface circuit in the image data processor.

SUMMARY

One aspect of the present embodiment is an image processing device for use with a storage circuit and processing image data for a frame formed by a plurality of pixels. The image processing device includes a first functional macro for performing first image processing on the image data, generating first processed image data, and temporarily storing the first processed image in a predetermined region of the storage circuit. A second functional macro performs second image processing following the first image processing. The second functional macro reads the first processed image data from the predetermined region of the storage circuit, performs the second image processing on the first processed image data, and generates second processed image data. A monitor circuit, arranged in at least one of the first and the second functional macros, monitors a frame that is being processed by the other one of the functional macros and a number of a data line in the frame that is being processed.

BRIEF DESCRIPTION OF THE DRAWINGS

The embodiment, together with objects and advantages thereof, may best be understood by reference to the following description of the presently preferred embodiments together with the accompanying drawings in which.

DETAILED DESCRIPTION OF THE PREFERRED EMBODIMENTS

An image processing device according to a preferred embodiment of the present embodiment will now be described with reference to the drawings.

Figure 2A:
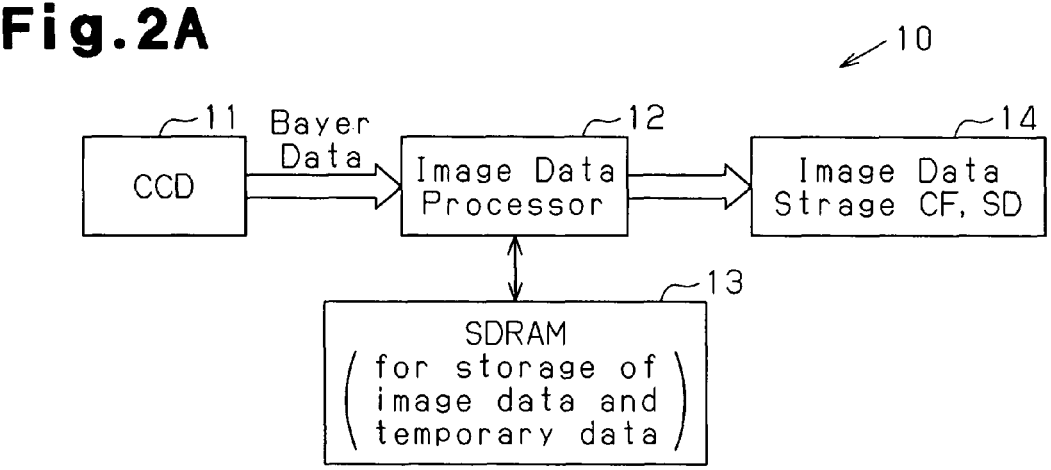
FIGS. 2A and 2B are block diagrams of a digital camera according to a preferred embodiment of the present embodiment.

In the preferred embodiment, the image processing device is incorporated in a digital camera. As shown in FIG. 2A, the digital camera 10 includes a CCD image sensor 11, an image data processor 12 formed by an LSI, an SDRAM 13, and a portable memory card 14 such as a CF or an SD. The SDRAM 13 and the memory card 14 are connected to the image data processor 12. The image data processor 12 is one example of the image processing device defined in claims. The SDRAM 13 is one example of the storage circuit defined in claims. The memory card 14 is one example of the external storage defined in claims.

The CCD image sensor 11 converts the light of an imaging subject that enters an optical system such as optical lens into an electrical signal. An A/D converter (not shown) then converts the electrical signal into a digital signal. The image data for a picture, or a frame, is generated from image data for pixels. In one example, the CCD image sensor 11 converts light transmitted through an RGB filter into an electrical signal. In this case, the image data for each pixel is in the RGB format (so-called Bayer data).

The image data processor 12 acquires the image data of a frame and executes various image processing on the image data. The image data processor 12 temporarily stores the image data in the SDRAM 13 whenever performing image processing. The final frame image data that has undergone image processing and has been stored in the SDRAM 13 is then stored in the portable memory card 14 by the image data processor 12.

Figure 2B:
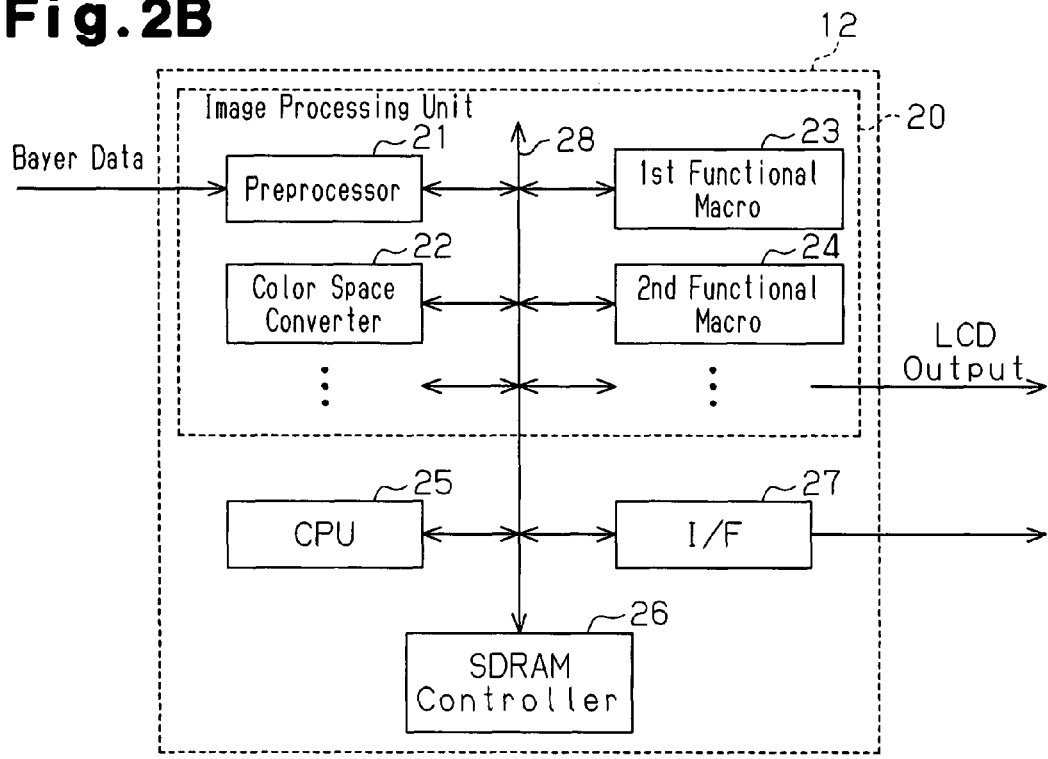

The image data processor 12 will now be described with reference to FIG. 2B. The image data processor 12 includes an image processing unit 20, a CPU 25, an SDRAM controller 26, and an interface circuit (I/F) 27, which are connected to one another by a bus 28. The bus 28 includes an address bus for transmitting an address signal, a data bus for transmitting a data signal, and a control bus for transmitting a control signal. The CPU 25 includes a ROM region storing programs (firmware) and controls each section of the image processing unit 20 and the like by executing the programs. The image processing unit 20 includes a preprocessor 21, a color space converter 22, and a plurality of functional macros. The plurality of functional macros includes at least a first functional macro 23 and a second functional macro 24.

The preprocessor 21 executes preprocesses on the image data of the frame, such as white balance adjustment, gain adjustment, and correction of a defective signal. The color space converter 22 converts the processing result of the preprocessor 21, that is, the preprocessed image data in the RGB format (Bayer data) to image data in the YCbCr format. The image data of the frame processed by the preprocessor 21 and the color space converter 22 are temporarily stored in the SDRAM 13, for example, under the control of the. SDRAM controller 26 and the bus 28 by the CPU 25. The image data of each pixel converted into the YCbCr format is divided into luminance Y, chrominance Cb, and color difference Cr and stored in the SDRAM 13.

The first functional macro 23 reads the processed and converted image data of the frame from the SDRAM 13. Then, the first functional macro 23 executes a resolution conversion process to reduce or enlarge the image size (resolution) of the image data. The image data processed by the first functional macro 23 is divided into luminance Y, chrominance Cb, and color difference Cr and temporarily stored in the SDRAM 13.

Following the processing by the first functional macro 23, the second functional macro 24 executes processing that differs from that of the first functional macro 23. For example, the second functional macro 24 reads the image data processed by the first functional macro 23 from the SDRAM 13 and executes JPEG processing to compress the image data in compliance with the JPEG format. The image data processed by the second functional macro 24 is temporarily stored in the SDRAM 13.

Upon completion of each image processing performed by the functional macros, the final frame image data stored in the SDRAM 13 is provided to and stored in the portable memory card 14 via the interface circuit 27. For example, if the plurality of functional macros include only the first and second functional macros 23 and 24, the processing result of the second functional macro 24 is provided from the SDRAM 13 to the portable memory card 14. The final image data may be provided to the portable memory card 14, for example, under the control of the SDRAM controller 26 and the bus 28 by the CPU 25. The final image data may be provided to a display device such as a liquid crystal display (LCD) via a display interface circuit (not shown)

Figure 3:
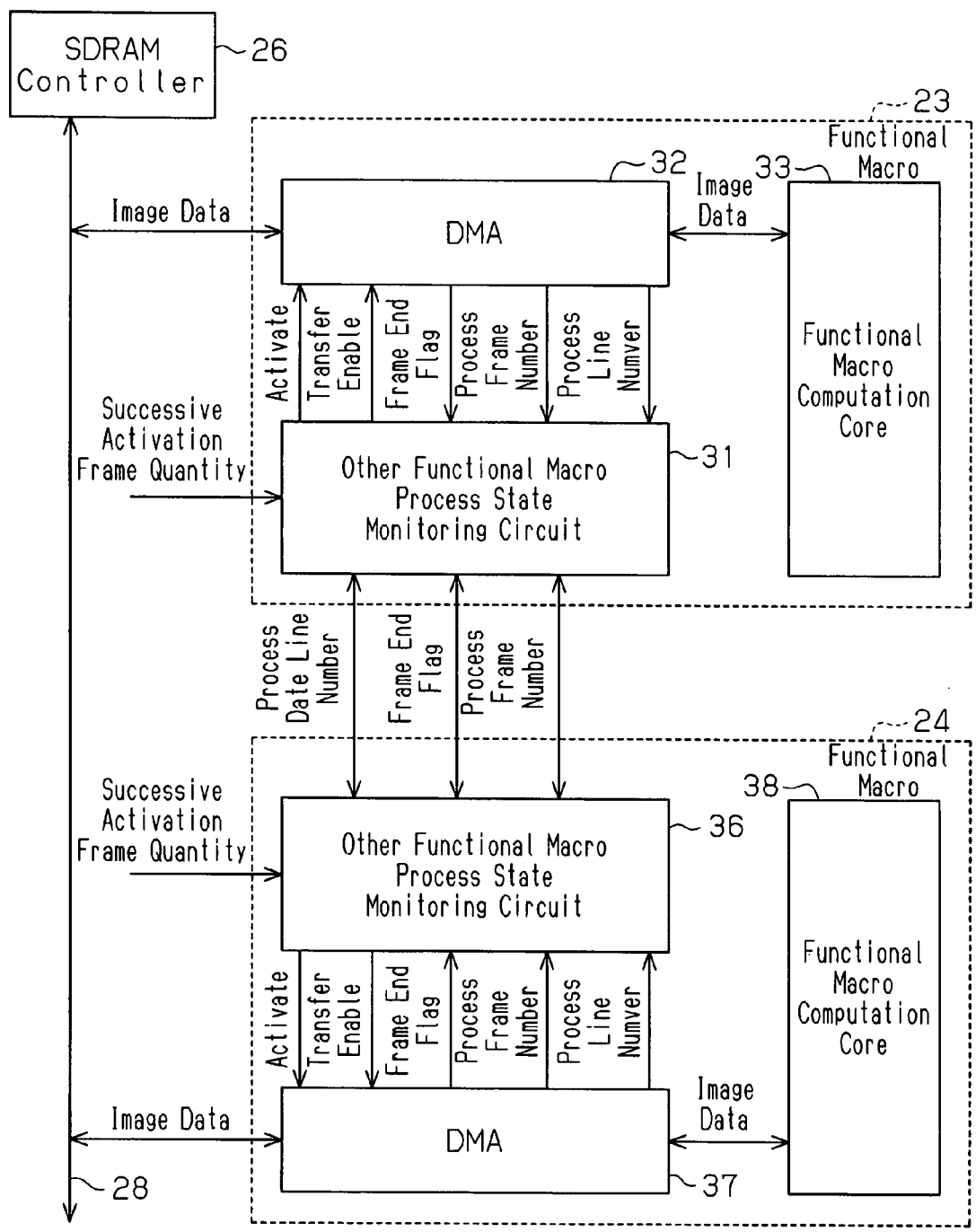
FIG. 3 is a block diagram of a functional macro in the preferred embodiment.

The first and second functional macros 23 and 24 will now be described with reference to FIG. 3. The first functional macro 23 includes a monitoring circuit (other functional macro process state monitoring circuit 31) for monitoring the process state of the second functional macro 24, a direct memory access (DMA) controller 32, and a functional macro computation core 33 for performing first image processing (e.g., resolution conversion) on the image data. The second functional macro 24 includes a monitoring circuit (other functional macro process state monitoring circuit 36) for monitoring the process state of the first functional macro 23, a DMA controller 37, and a functional macro computation core 38 for performing second image processing (e.g., JPEG process) on the image data that has undergone the first image processing. The other functional macro process state monitoring circuits 31 and 36 of the first and second functional macros 23 and 24 are electrically connected to each other.

The other functional macro process state monitoring circuits 31 and 36 respectively monitor the second and first functional macros 24 and 23. In other words, the monitoring subject of the other functional macro process state monitoring circuit 31 in the first functional macro 23 is the second functional macro 24. The monitoring subject of the other functional macro process state monitoring circuit 36 in the second functional macro 24 is the first functional macro 23. A process frame number signal indicating the number of the frame processed by the first and second functional macros 23 and 24, a process data line number signal indicating the number of the data line in the frame that is undergoing processing, and a frame end flag signal indicating that the frame has completed every processing are exchanged between the other functional macro process state monitoring circuits 31 and 36. That is, the other functional macro process state monitoring circuits 31 and 36 arranged in at least one of the first and the second functional macro 23 and 24 monitors the frame being processed by the functional macro that is monitored, the number of the data line in the frame that is being processed, and the processing completion of the frame. The CPU 25 controls the operation of each of the other functional macro process state monitoring circuits 31 and 36.

The other functional macro process state monitoring circuit 31 is electrically connected to the DMA controller 32. The DMA controller 32 is activated in response to an activation signal (process start command signal) provided from the other functional macro process state monitoring circuit 31. The DMA controller 32 transfers the image data by performing DMA in response to a transfer enable signal provided from the other functional macro process state monitoring circuit 31. The DMA controller 32 provides the other functional macro process state monitoring circuit 31 with the process frame number signal indicating the frame being processed by the first functional macro 23 (functional macro computation core 33) and the frame end flag signal indicating the completion of every processing of the frame. The other functional macro process state monitoring circuit 31 generates the process frame number signal and the frame end flag signal based on signals received from the DMA controller 32 and provides the signals to the second functional macro 24 (other functional macro process state monitoring circuit 36).

When receiving the activation signal and the transfer enable signal from the other functional macro process state monitoring circuit 31, the DMA controller 32 controls direct exchange of the frame image data between the SDRAM 13 and the functional macro computation core 33. That is, the DMA controller 32 controls the SDRAM controller 26 and the bus 28 to read the image data of the original frame that is subject to image processing from the SDRAM 13 to provide the image data to the functional macro computation core 33. The DMA controller 32 controls the SDRAM controller 26 and the bus 28 to rewrite the image processed image data received from the functional macro computation core 33 to the SDRAM 13. The DMA controller 32 monitors the image data that has undergone image processing and has been rewritten to the SDRAM 13, generates the process frame number signal and the frame end flag signal in response to the monitoring result, and provides the signals to the other functional macro process state monitoring circuit 31.

The first functional macro 23 performs image processing on each of the blocks generated by grouping the data lines of a single frame in accordance with a predetermined mode. The DMA controller 32 reads the image data of the original frame subject to image processing in blocks from the SDRAM 13 and provides the same to the functional macro computation core 33. Then, the DMA controller 32 rewrites the image data of the blocks provided from the functional macro computation core 33 that have undergone image processing to the SDRAM 13. Accordingly, the other functional macro process state monitoring circuit 31 checks the data line number signal output from the DMA controller 32 to determine the block that is being processed, that is, the data line number of the first functional macro 23 (functional macro computation core 33). The other functional macro process state monitoring circuit 31 notifies the other functional macro process state monitoring circuit 36 in the second functional macro 24 of the determined processed data line number.

The other functional macro process state monitoring circuit 36 is electrically connected to the DMA controller 37. The DMA controller 37 is activated in response to an activation signal (process start command signal) provided from the other functional macro process state monitoring circuit 36. The other functional macro process state monitoring circuit 36 monitors number of the data line that is being processed by the first functional macro 23 to control the activation timing of the DMA controller 37 so that processing is performed at the same time as the first functional macro 23. Further, the other functional macro process state monitoring circuit 36 receives from the DMA controller 37 a process frame number signal indicating the frame being processed by the second functional macro 24 (functional macro computation core 38), a frame end flag signal indicating the completion of every processing of the frame, and a process line number signal indicating the number of the line being processed by the second functional macro 24. The other functional macro process state monitoring circuit 36 generates the process frame number signal, the frame end flag signal, and the process line number signal based on the signals received from the DMA controller 37 and provides the signals to the other functional macro process state monitoring circuit 31 of the first functional macro 23.

When receiving the activation signal and the transfer enable signal from the other functional macro process state monitoring circuit 36, the DMA controller 37 controls direct exchange of the frame image data between the SDRAM 13 and the functional macro computation core 38. That is, the DMA controller 37 controls the SDRAM controller 26 and the bus 28 to read the image data of the original frame subject to image processing from the SDRAM 13 and provides the image data to the functional macro computation core 38. Further, the DMA controller 37 controls the SDRAM controller 26 and the bus 28 to rewrite the image data that has been image processed and received from the functional macro computation core 38 to the SDRAM 13. The DMA controller 37 monitors the image data that has been image processed and that will be rewritten to the SDRAM 13 to generate the process frame number signal and the frame end flag signal in accordance with the monitoring result and provide the signals to the other functional macro process state monitoring circuit 36.

The second functional macro 24 performs image processing on each of the blocks generated by grouping the data lines of a single frame in accordance with a predetermined mode. The DMA controller 37 reads the image data of the original frame subject to image processing in blocks from the SDRAM 13 and provides the same to the functional macro computation core 38. Then, the DMA controller 37 rewrites the image data of the blocks provided from the functional macro computation core 38 that have undergone image processing to the SDRAM 13. Accordingly, the other functional macro process state monitoring circuit 36 checks the data line number signal output from the DMA controller 37 to determine the block that is being processed, that is, the data line number of the second functional macro 24 (functional macro computation core 38). The other functional macro process state monitoring circuit 36 notifies the other functional macro process state monitoring circuit 31 in the first functional macro 23 of the determined number of the processed data line.

The CPU 25 functions as a setting circuit for setting a successive frame processing number to the other functional macro process state monitoring circuits 31 and 36. For example, if a plurality of frames must be successively processed such as when the digital camera 10 is in a continuous shooting mode, the CPU 25 provides each of the other functional macro process state monitoring circuit 31 and 36 with the successive frame processing number signal indicating the number of successively processed frames. The other functional macro process state monitoring circuits 31 and 36 checks from the associated DMA controller 32 and 37 whether or not every processing of the frames that have been successively processed has ended based on the process frame number signal and the frame end flag signal.

The operation of the other functional macro process state monitoring circuits 31 and 36 will now be described. The other functional macro process state monitoring circuits 31 and 36 are activated in response to the successive process frame number signal provided from the CPU 25. Then, the other functional macro process state monitoring circuits 31 and 36 provide the activation signal to the associated DMA controllers 32 and 37. The other functional macro process state monitoring circuits 31 and 36 provide the transfer enable signal for transferring the image data performing DMA to the associated DMA controllers 32 and 37.

The other functional macro process state monitoring circuits 31 and 36 receive the process line number signal, the process frame number signal, and the frame end flag signal from the corresponding DMA controllers 32 and 37. Further, the other functional macro process state monitoring circuits 31 and 36 provide the process frame number signal, the process data line number signal and the frame end flag signal to the other one of the other functional macro process state monitoring circuits 36 and 31.

Based on the process frame number signal, the process data line number signal, and the frame end flag signal provided from the other one of the other functional macro process state monitoring circuits 36 and 31, the other functional macro process state monitoring circuits 31 and 36 monitors the processing state of the functional macros 24 and 23 of the other one of the functional macro process state monitoring circuits 36 and 31, that is, the number of the data line in the frame that is being processed and whether the processing of the frame has been completed. In this manner, the other functional macro process state monitoring circuits 31 and 36 monitor the functional macros 24 and 23 of the other one of the other functional macro process state monitoring circuits 36 and 31 while the functional macro computation cores 33 and 38 exchange the image data before and after the image processing with the SDRAM 13 via the DMA controllers 32 and 37. The monitoring of the functional macro 24 and 23 by the other functional macro process state monitoring circuit 31 and 36 may be performed at the timing the image data is exchanged between the functional macro computation cores 33 and 38 and the SDRAM 13. Alternatively, the monitoring may be performed at any timing irrespective of the image data exchange. The other functional macro process state monitoring circuit 31 and 36 ends processing when confirming that all processing of the successively processed frames has been completed.

Figure 4:
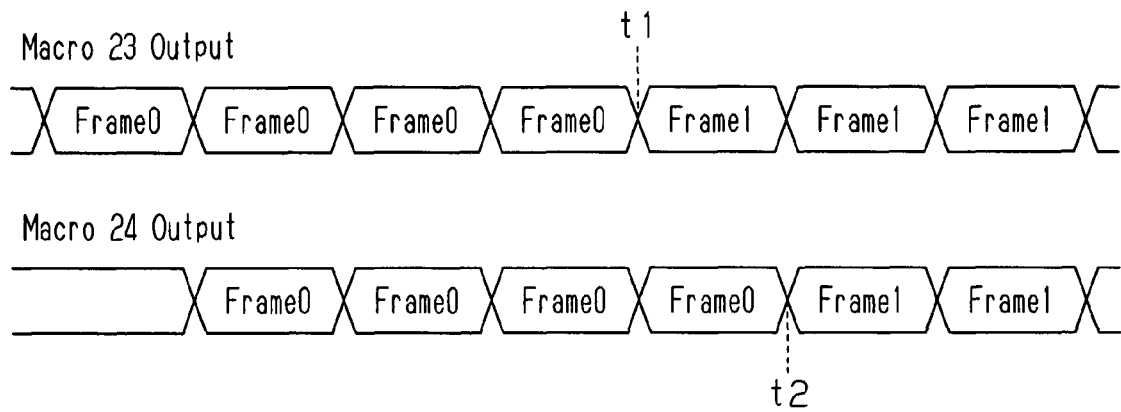
FIG. 4 is a timing chart showing the output signal shown in FIG. 3.

A specific example in which a plurality of frames undergo successive processing will now be described with reference to FIG. 4. Two frames 0 and 1 are shown in FIG. 4 as the plurality of frames. Each frame is divided into a plurality of blocks (e.g., four). The first functional macro 23 outputs the image data of each block that has undergone image processing and rewrites the image data to the SDRAM 13. The second functional macro 24 monitors the number of the data line being processed by the first functional macro 23, reads and performs image processing on the image data rewritten to the SDRAM 13 by the first functional macro 23 in blocks, outputs the image data of each block that has undergone image processing, and rewrites the image data to the SDRAM 13.

When the first functional macro 23 ends every processing performed on the frame 0 and starts to process the next frame 1, the first functional macro 23 checks the number of the data line of the image data for the frame 0 that is being processed by the second functional macro 24. The first functional macro 23 then acknowledges the image data being processed by the second functional macro 24, specifies the storage region of the SDRAM 13 in which the original image data that is being processed is temporarily stored, and uses the storage region as a vacant region, or an available region. The first functional macro 23 overwrites the image data of the next frame 1 that has undergone image processing in this region of the SDRAM 13.

Figure 5:
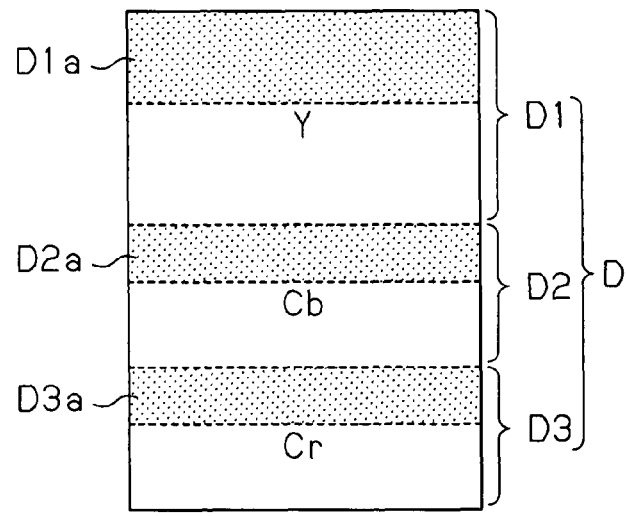
FIG. 5 is a diagram showing a frame storage region for a first functional macro shown in FIG. 3.

The image data processed by the first functional macro 23 is rewritten to storage region D (see FIG. 5) of the SDRAM 13. The storage region D includes three divided regions D1, D2, and D3. The image processed image data is divided into luminance Y, chrominance Cb, and color difference Cr and respectively stored in the three divided regions D1, D2, and D3. The image data that has been processed by the second functional macro 24 is stored in regions D1a, D2a, and D3a, which are shown in a shaded state in FIG. 5. In other words, the image data read by the second functional macro 24 is stored in the shaded regions D1a, D2a, and D3a. The first functional macro 23 checks the region storing the image data processed by the second functional macro 24 and acknowledges the regions D1a, D2a, and D3a of the SDRAM 13 temporarily storing the image data as the available regions to use the regions D1a, D2a, and D3a as the region for writing the image data of the next frame 1 that has undergone processing.

Figure 1:
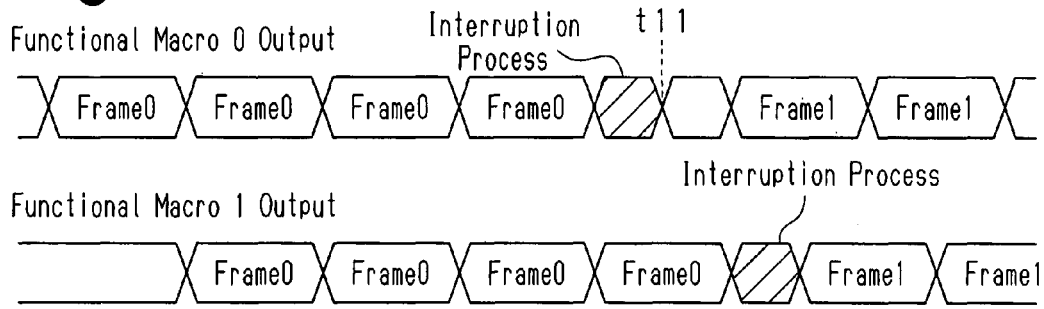
FIG. 1 is a timing chart showing outputs of first and second functional macros in the prior art.

The first and second functional macros 23 and 24 each successively processes the frames 0, 1, ... in accordance with the successive frame processing number set by the successive process frame number signal from the CPU 25. Specifically, the first and second functional macros 23 and 24 each immediately starts the processing of the next frame 1 without performing the interruption process (see FIG. 1) when every processing for the frame 0 is completed (times t1 and t2 as shown in FIG. 4). First and second functional macros 23 and 24 repeats the successive processing of the preceding frame and the next frame for a number of times set by the successive frame processing number and processes all of the successively input frames.

The preferred embodiment has the advantages described below.

(1) The other functional macro process state monitoring circuits 31 and 36 mutually monitor the frames being processed by the first and second functional macros 23 and 24 and the number of the data line of the image data in the frame that is being processed. Accordingly, when the every processing for a frame is about to be completed, the first functional macro 23 that is about to start the processing of the next frame checks the number of the data line of the image data for the frame that is presently being processed by the second functional macro 24 to acknowledge the image data that has been processed by the second functional macro 24. This enables the first functional macro 23 to acknowledge the region of the SDRAM 13 in which the original image data of the processed image data is temporarily stored as the available region. The first functional macro 23 overwrites the image data of the next frame that has undergone processing in the acknowledged region. This improves the usage efficiency of the SDRAM 13. Further, the first functional macro 23 starts the processing of the next frame at an earlier timing without waiting for every processing performed on the preceding frame by the second functional macro 24 to end.

(2) The input of the successive process frame number signal by the CPU 25 sets the successive frame processing number for the first and second functional macros 23 and 24. The functional macros 23 and 24 automatically start the processing of the next frame when all of the processing performed on the preceding frame is completed. Further, the functional macros 23 and 25 repeat this operation for a number of times set by the successive frame processing number. Therefore, an interruption process for checking whether the processing of the next frame can be started is unnecessary when every one of the processing performed on the preceding frame is completed. This reduces the overhead (load) of the first and second functional macros 23 and 24.

(3) The DMA controllers 32 and 37 of the first and second functional macros 23 and 24 enable direct exchange of image data between the SDRAM 13 and the first and second functional macros 23 and 24. This reduces the load on the CPU 25.

(4) The second functional macro 24 monitors the number of the data line in the preceding frame that is being processed by the first functional macro 23. This enables the second functional macro 24 to start processing the next frame without waiting for every processing to be performed on the preceding frame by the first functional macro 23. This reduces the time required for successive frame processing.

It should be apparent to those skilled in the art that the present embodiment may be embodied in many other specific forms without departing from the spirit or scope of the embodiment. Particularly, it should be understood that the present embodiment may be embodied in the following forms. A CMOS image sensor may be used in place of the CCD image sensor 11.

An appropriate RAM may be used in place of the SDRAM 13.

The color space converter 22 may convert image data (Bayer data) in RGB format into image data in YUV format.

The first and second functional macros 23 and 24 may be functional macros performing image processing such as noise or edge emphasis.

The elements of the image data processor 12 may all be integrated into a single LSI. Alternatively, two or more of the elements may be combined in any manner and integrated on an LSI.

The other functional macro process state monitoring circuits 31 and 36 may monitor the number of times data is written to the SDRAM 13 (or read from the SDRAM 13) by the associated DMA controllers 32 and 37 to check number of the data line that is being processed by the functional macros 23 and 24.

When dividing one frame into a plurality of blocks, the number of data lines for each block may be set in accordance with the number of data lines processed by the functional manner. For example, each block may have eight lines when JPEG processing is performed.

The present embodiment is also applicable when a plurality of frames needs to be successively processed such as when repetitively taking pictures within a relatively short period even when the digital camera 10 is in a single shooting mode.

The present embodiment is applicable when processing image data of a plurality of frames such as when successively scanning a photograph or a printed material with an image scanner.

The number of functional macros that are ordered for image processing may be three or more. In this case, the frame and the data line number of the image data that is being processed are mutually monitored by two of the functional macros that are in a consecutive order with respect to image processing.

The present examples and embodiments are to be considered as illustrative and not restrictive, and the embodiment is not to be limited to the details given herein, but may be modified within the scope and equivalence of the appended claims.

What is claimed is:

1. An image processing device comprising:
   a circuit performing processing image data for a frame formed by a plurality of pixels with a storage circuit;
   a first functional macro performing first image processing on the image data, generating first processed image data, and temporarily storing the first processed image in a predetermined region of the storage circuit;
   a second functional macro performing second image processing following the first image processing, the second functional macro reading the first processed image data from the predetermined region of the storage circuit, performing the second image processing on the first processed image data, and generating second processed image data; and
   a monitor circuit, arranged within at least one of the first and the second functional macros, monitoring a frame being processed by the other one of the functional macros and a number of a data line in the frame that is being processed.

2. The image processing device according to claim 1, further comprising a setting circuit setting a successive frame processing number for each functional macro.

3. The image processing device according to claim 1, wherein the first and second functional macros each include a direct memory access controller exchanging the image data with the storage circuit in a direct memory access format.

4. The image processing device according to claim 1, wherein a mode is included for successively processing a plurality of frames, and the monitor circuit includes:
   a first monitor circuit, arranged in the first functional macro, monitoring the frame being processed by the second functional macro and the number of the data line in the frame that is being processed; and
   a second monitor circuit, arranged in the second functional macro, monitoring the frame being processed by the first functional macro and the number of the data line in the frame that is being processed, wherein the first monitor circuit and the second monitor circuit notify each other of a result of the monitoring.

5. The image processing device according to claim 4, wherein each functional macro divides each of the plurality of frames into a plurality of blocks and processes each block, and each functional macro immediately starts the processing of the next frame without performing an interruption process when the processing of all of the blocks in the preceding frame ends.

6. The image processing device according to claim 1, wherein the first functional macro overwrites the first processed image data of the preceding frame stored in the storage circuit with the first image processed image data of the next frame based on the number of the data line in the preceding frame that is being processed by the second functional macro.

7. The image processing device according to claim 1, wherein the first functional macro specifies a storage region storing the image data read by the second functional macro from the image data processed by the first functional macro, and uses the specified storage region as a vacant region storing image data after image processing the next frame.

8. The image processing device according to claim 1 comprising:
   a plurality of functional macros including the first and second functional macros, wherein final image data generated through sequential processing by the plurality of functional macros is transferred from the storage circuit to an external storage.

9. An image processing method comprising:
   performing first image processing on image data for a frame formed by a plurality of pixels and generating first processed image data via a first functional macro of a processor;
   temporarily storing the first processed image in a predetermined region of the storage circuit via the first functional macro;
   reading the first processed image data from the predetermined region of the storage circuit via a second functional macro of the processor;
   performing the second image processing on the read first processed image data and generating second processed image data by the second functional macro; and
   monitoring, via a monitor circuit arranged within at least one of the first and second functional macros, a frame that is being processed by the other one of the at least one of the first and second functional macros and a number of a data line in the frame that is being processed.

10. The image processing method according to claim 9, further comprising:
    setting a successive frame processing number for each functional macro.

11. The image processing method according to claim 9, further comprising:
    exchanging the image data in a direct memory access format between the storage circuit and each of the first and second functional macros.

12. The image processing method according to claim 9 including a mode successively processing a plurality of frames, wherein the monitoring includes:

monitoring the frame being processed via the second functional macro and the number of the data line in the frame that is being processed with the first functional macro;

monitoring the frame being processed via the first functional macro and the number of the data line in the frame that is being processed with the second functional macro; and the first monitor circuit and the second monitor circuit notifying each other of a result of the monitoring.

13. The image processing method according to claim 12, wherein each functional macro divides each of the plurality of frames into a plurality of blocks and processes each block, and each functional macro immediately starts the processing of the next frame without performing an interruption process when the processing of all of the blocks in the preceding frame ends.

14. The image processing method according to claim 9, further comprising:

overwriting the first processed image data of the preceding frame stored in the storage circuit with the first image processed image data of the next frame based on the number of the data line in the preceding frame that is being processed via the second functional macro.

15. The image processing method according to claim 9, further comprising:

specifying a storage region storing the image data read via the second functional macro from the image data processed via the first functional macro; and using the specified storage region as a vacant region to store image data after image processing the next frame.

16. The image processing method according to claim 9, further comprising:

transferring final image data generated through sequential processing via a plurality of functional macros including the first and second functional macros from the storage circuit to an external storage.

* * * * *